INVENTOR.
ROGER ROBERTS

April 23, 1968  R. ROBERTS  3,379,373
METHOD AND MEANS FOR PRODUCING AND CONTROLLING
THE DISCHARGE OF FOG
Filed Dec. 22, 1965  2 Sheets-Sheet 2
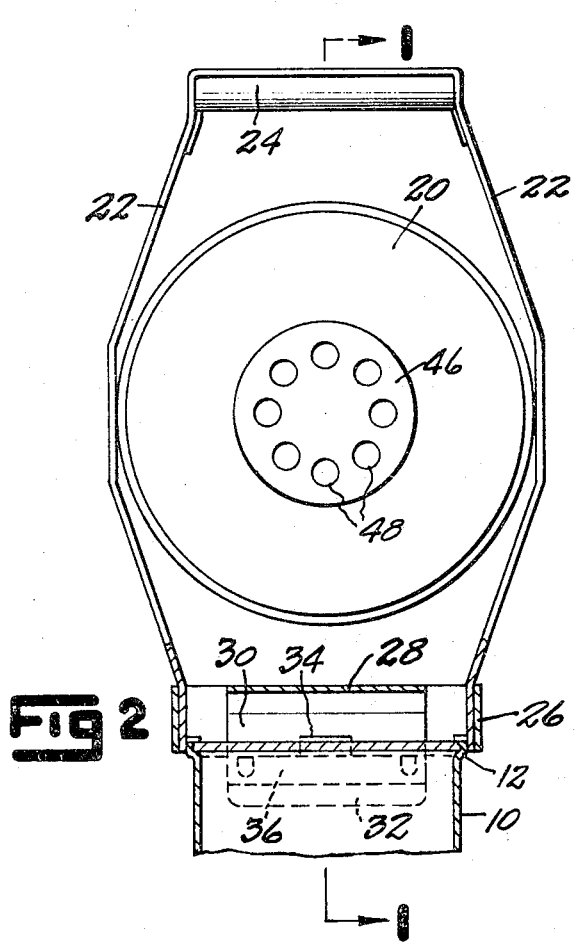
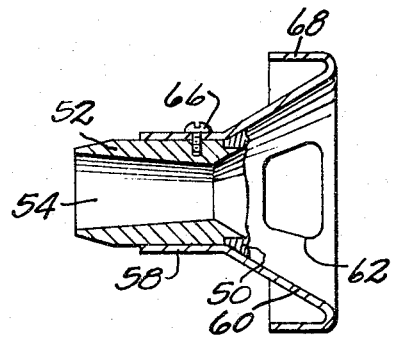
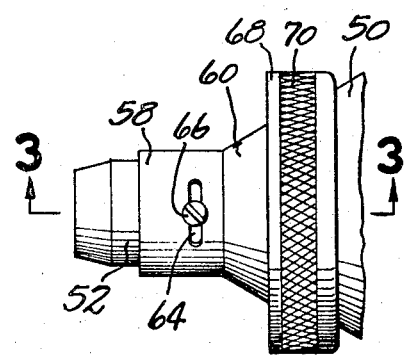
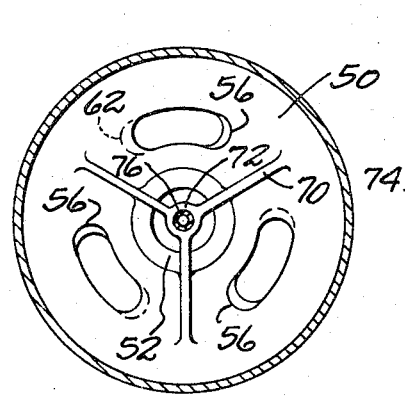
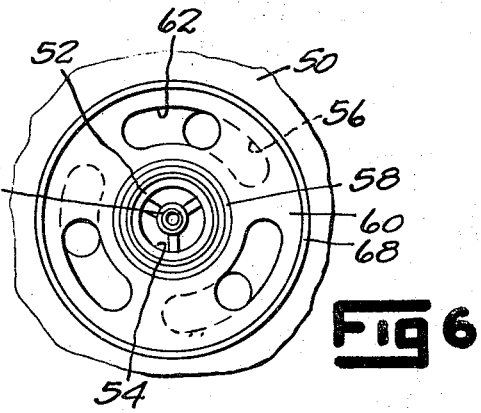
INVENTOR.
ROGER ROBERTS
BY *Eugene C. Knoblock*
ATTORNEY

United States Patent Office 3,379,373
Patented Apr. 23, 1968

3,379,373
METHOD AND MEANS FOR PRODUCING AND CONTROLLING THE DISCHARGE OF FOG
Roger Roberts, Lowell, Mich., assignor to Root-Lowell Manufacturing Company, Lowell, Mich., a corporation of Ohio
Filed Dec. 22, 1965, Ser. No. 515,594
10 Claims. (Cl. 239—8)

This invention relates to improvements in method and means for producing and controlling the discharge of fog, and more particularly to method and devices in which very small particles of liquid, such as insecticides, deodorants or scenting materials, are entrained in an air stream to be dispersed or distributed in the form of a fog or mist.

The primary object of this invention is to provide a novel, simple and inexpensive device of this character which can be adjusted readily and simply to produce a fog of desired character.

A further object is to provide a device of this character which has a novel adjustment means to accommodate modulation of the rate or pick-up or eduction of liquid in an air stream and modulation of the range of discharge or dispersion of fog from the device.

A further object is to provide a device of this character having a tapered housing with a central discharge opening defining a venturi into which a liquid supply conduit projects, and having a circular series of openings around said discharge opening and controlled by modulating means shiftable relative thereto for the purpose of regulating the proportion of total air flow in the housing which is discharged past the liquid supply conduit at the central opening and the proportion of air which is discharged at the circular series of openings.

A further object is to provide a device of this character having a central outlet and a circular series of apertures surrounding the central outlet for the discharge of air within a skirt projecting from the device and surrounding said series of apertures.

A further object is to provide a device of this character with novel, simple, easily operated means for detachably mounting it upon the outlet portion of a liquid container.

Further objects will be apparent from the following specification.

In the drawings:

FIG. 2 is an end view of the device with parts shown in section, taken on line 2—2 of FIG. 1;

FIG. 3 is an axial sectional detail view of the discharge nozzle and valve of the device, taken on line 3—3 of FIG. 4;

FIG. 4 is a fragmentary side elevational view of the discharge nozzle and valve of the device;

FIG. 5 is a transverse sectional view taken on line 5—5 of FIG. 1; and

FIG. 6 is a fragmentary end view of the device as seen along line 6—6 of FIG. 1.

Figure 1:
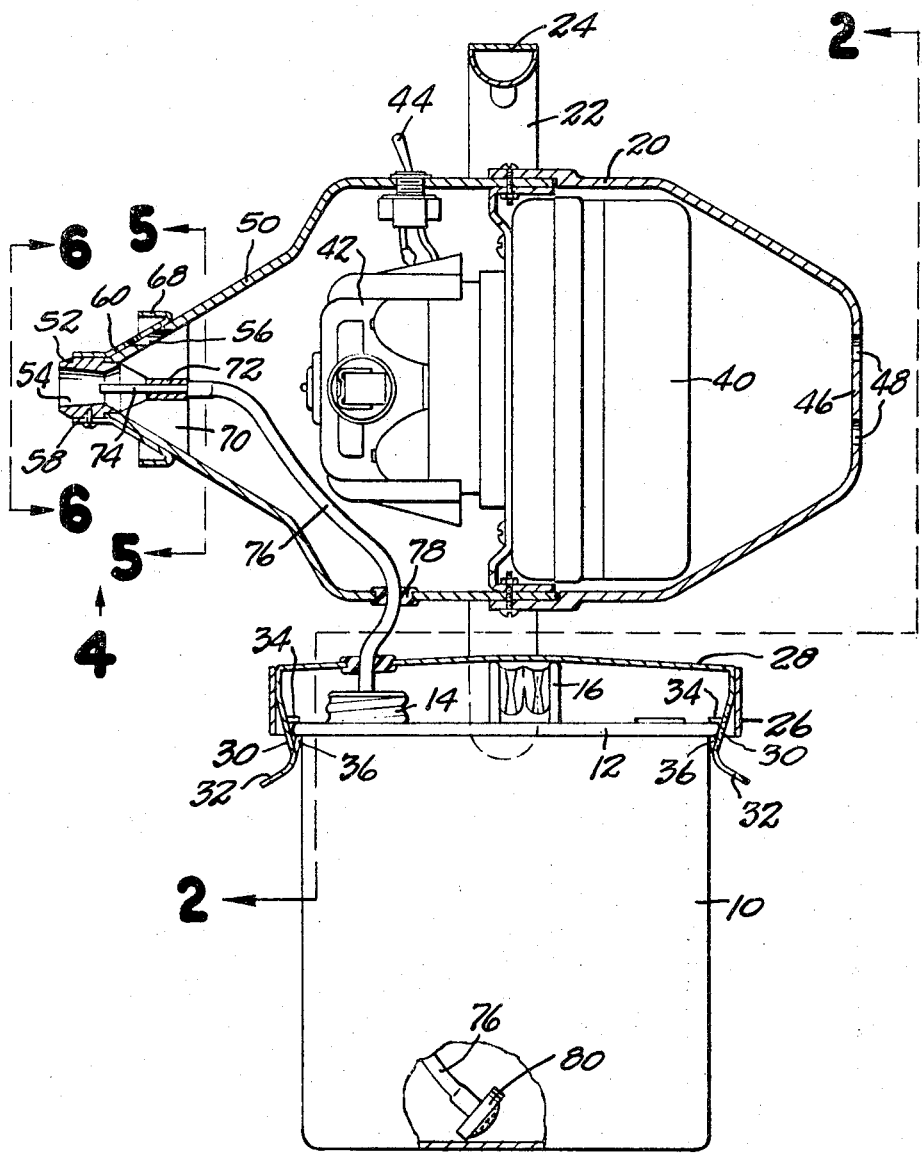
FIG. 1 is a vertical longitudinal sectional view of the device taken on line 1—1 of FIG. 2 and mounted upon a container having parts thereof broken away.

The numeral 10 designates a liquid container which may be of any suitable type, preferably having a marginal bead 12 at its upper margin. The container may have a pouring opening or spout 14 and may be provided with a handle 16.

My improved fogging device has a housing 20 which is secured to opposite side parts 22 of a bail or handle unit which includes a hand grip portion 24. The side parts 22 project below the housing 20 and fixedly mount, adjacent their lower ends, a horizontal container carrier ring or band 26 which is adapted to fit with clearance around the upper part of the container 10 and which preferably has a releasable interlock with the container. Thus an elongated spring leaf member 28 may extend across the carrier ring or band 26, being secured thereto at opposite parts of said band and having end portions 30 projecting downwardly and inwardly from the band to a level below the band and terminating in spaced relation below the band at outturned hand grip portions 32. Each spring part 30 has an inturned flange or abutment 34 which is adapted to bear upon the top of the bead 12 of the container 10. Spaced below each spring flange 34 is an upwardly inwardly inclined flange or finger 36 which is adapted to engage under the container bead 12 while flange 34 rests upon the upper surface of the container bead. The arrangement is such that downward pressure upon the handle 24 to apply the spring parts 30 to the upper part of container 10 spreads or deflects the parts 30 while the flanges 36 ride past the bead 12, whereupon spring parts 30 flex inwardly to cause part 36 to underlie the bead while part 34 bears upon the top of the bead. The unit can be readily disassembled from the container by flexing one of the spring parts 30 outwardly and tilting the unit to disengage the container bead at the flexed part, whereupon the device is released for removal at the opposite side of the container, or by flexing both parts 30.

The housing 20 of the fogging device encloses an air blower or impeller 40 of any suitable type and an electric motor 42 for driving the blower under the control of a suitable switch having an externally positioned actuator 44, preferably located adjacent the hand grip 24. One end wall 46 of the housing has a plurality of apertures 48 by which air may be drawn into the housing and forced therethrough by the blower or impeller 40.

The discharge end portion of the housing 20 is preferably of tapered or frusto conical configuration at 50 and has a central opening in which is mounted a discharge nozzle 52. The nozzle has a passage 54 therethrough which is of smallest diameter intermediate its ends, and a frusto conical outwardly flaring portion. The external shape of the projecting portion of the nozzle is preferably substantially cylindrical. The conical housing part 50 cooperates with the nozzle passage to define a venturi.

A circular series of apertures 56 is formed in the tapered housing part 50 adjacent the central opening therein but spaced radially therefrom and from the nozzle 52. A collar 58 rotatably encircles the cylindrical nozzle part 52 and carries a frusto conical valve member 60 bearing against the outer surface of the tapered housing part 50 to span the openings 56. Valve member 60 is provided with a circular series of spaced valving apertures or interruptions 62 adapted to register with the housing apertures 56 and having their centers spaced apart substantially equally to the center-to-center spacing of the apertures 56. The valve apertures 62 are so related to the housing apertures 56 that in any given rotative adjustment of the valve member 60 other than a closed position, a selected degree of register of said openings 56 and 62 will occur. Thus openings 56 and 62 may fully register or may be partially in register to any selected extent, or may be out of register so as to close off discharge from the housing therethrough.

Any suitable means may be provided to limit the rotative valve adjustment and, for this purpose, an elongated circumferentially extending slot 64 may be formed in collar 58 which carries a pin or abutment 66 extending through the slot. The length of the slot will determine the extent of the rotative movement of the valve member 60. If desired, calibrating indicia (not shown) may be provided upon the collar 58, and upon the nozzle 52 or the abutment 66 to indicate the setting of the valve member in terms of any of the various characteristics of the device, such as range of discharge of the fog or extent of liquid pick-up in the fog.

A substantially cylindrical skirt or discharge regulating flange 68 projects forwardly from the large diameter end of the frusto conical valve member 60. Flange 68 may be carried by member 60 and knurled at 70 to facilitate rotative adjustment of the valve member, or may be fixed on the housing part 50. The skirt 68 will preferably project forwardly to completely encircle the apertures 62 of the valve member, and the extent of forward projection thereof may vary according to the degree of discharge guiding or regulating function which is to be served thereby, as hereinafter discussed.

The frusto conical housing portion 50 preferably has a plurality of fins or vanes 70 at its small end portion, which fins or vanes merge at a central tubular support 72 which extends coaxially of the center opening of the housing part 50 and of the nozzle 52. A liquid discharge tube 74 is mounted in the support 72 and preferably projects into the nozzle 52 adjacent to the minimum diameter portion of the bore thereof. A flexible tube 76 is connected to the rear end of the discharge tube 74 and extends through the housing 20 to and through an opening in the bottom of the housing in which is mounted a suitable grommet 78 having a snug fit around the flexible tube 76. The portion of the flexible tube 76 which projects exteriorly of the housing 20 is preferably of sufficient length to enter the opening 14 of the container 10 and to extend to the bottom of the container at which it mounts an apertured inlet member 80 bearing upon the bottom of the container.

In the operation of the device, assuming that the valve member 60 is adjusted to close the housing openings 56, the motor driven air blower or impeller, when operative, will produce a forced circulation of air lengthwise in the housing 20 from the inlets 48 thereof to and through the bore 54 of the nozzle 52. The high velocity passage of the air through the nozzle produces a suction action upon the free or discharge end of the liquid discharge tube 74 to suck liquid into the air and mix it with the air stream. The rate of entrainment of liquid will be determined by the speed and volume of air flow through the nozzle and by the diameter of the bore of the liquid discharge tube 74. The recovery angle of the flaring part of the bore 54 of the nozzle accommodates expansion of the air flow therethrough and the dispersion of liquid entrained in the air flow in minute particles. Also, the recovery angle provides for discharge of the air with entrained liquid, sometimes referred to as fog or mist, at the desired conical pattern. Assuming that the motor 42 operates at constant speed, it will be apparent that when the valve 60 is in closed position, the rate of discharge of fog, the concentration of liquid in the fog, and the pattern of discharge of fog will be constant.

When the valve member 60 is adjusted for partial or complete register of its valve openings 62 with the apertures 56 in the casing 20, the discharge of air from the unit is divided with a portion thereof discharging through the nozzle bore 54, past the liquid discharge tube 74 to entrain liquid in the air stream, and with the remainder of the air flow generated by the blower 40 being discharged in a plurality of air streams through apertures 56. This serves to reduce the rate at which liquid is entrained in the first named air stream so as to reduce the liquid concentration of the fog being discharged. Thus maximum eduction of liquid occurs when the openings 56 are closed, and minimum eduction of liquid occurs when the openings 56 are fully open. In adjustments in which partial registrations of the valve openings 62 with respect to the openings 56 occur, an intermediate rate of concentration of liquid in the fog will result between the minimum and the maximum and will be graduated according to the extent of register of the openings 62 with apertures 56. Thus it will be apparent that indicia can be employed upon the valve member and on the nozzle or some other stationary part which can be calibrated in terms of relative concentration of liquid entrainment as between a minimum and a maximum.

Another result of adjustment of the frusto conical valve member 60 for partial or full registration of its openings 62 with the apertures 56 is that the streams of air discharged through the air openings 56, which preferably have axes substantially parallel to the longitudinal axis of the casing and of the nozzle, are caused to impinge upon the generally conical pattern of fog being discharged from the bore 54 of the nozzle at areas spaced forwardly of the device. Such impingement tends to reduce the range or throw of the fog discharge from the nozzle aperture 54. This change will vary between a maximum range or throw when the valve is closed and a minimum range or throw when the valve is fully open, and intermediate positions of the valve will cause the control of throw or range between the maximum and the minimum. Another result of the impingement of air streams from lateral openings 56 upon the fog stream discharged from the nozzle openings 54 is that a greater lateral dispersion of the fog will occur when the valve 60 is open than when the valve is closed. The impingement of air streams from the openings 56 upon the fog tends to dilute the liquid concentration in the fog so that there is a substantial uniform concentration of liquid in the fog as it is dispersed following the impingement. Thus two factors occur to control the rate of concentration of liquid in the fog, the first being variation in the amount of liquid educed proportional to the rate of flow of air through the nozzle, and the second being the diluting effect upon the fog resulting from air stream impingement therewith.

One of the important characteristics of the device is that the skirt or flange 68 serves to minimize the angle of dispersion of air from the housing apertures 56. In this connection, while the skirt has been illustrated and described as being a part of the conical valve member 60 and being carried thereby, this arrangement is not essential, and the skirt may be fixedly carried by the casing part 50, in which event the valve member will have a rotative clearance therewith, and adjustment of the valve member will be required by manual contact with the collar 58 or an exposed portion of the frusto conical part 60 instead of with the flange 68. The presence of the skirt 68 serves to deflect air discharging from openings 56 which impinges thereagainst in a manner to direct the air in generally longitudinally directed streams to thereby insure impingement thereof with the fog emitted through the bore 54 of the nozzle.

It will be seen from the foregoing explanation that this device utilizes the conical valve member associated with the circular set of air discharge openings 56 as an adjustment means having a number of different functions. Stated differently, by a single adjustment of the rotative position of the valve member 60, the user is enabled to control the concentration of liquid in a fog discharge, the range or throw of fog discharge longitudinally, and the lateral dispersion of the fog being discharged. Each of these adjustments is accomplished while maintaining control of the particle size of liquids entrained in the fog, which is a function of the size of the bore of the discharge tube 74, the diameter and recovery angle of the bore 54 of the nozzle, and the position of the discharge tip of the tube 74 within the bore of the nozzle. Usually the particle size will be 50 microns or less, but it will be understood that this dimension is cited as illustrative and is not intended to be limiting.

Another element of the device which is worthy of consideration is the function of the vanes 70. These vanes tend to reduce eddy currents and swirling of air flow within the casing so as to tend to provide a longitudinal direction of discharge at the aperture 56. This is accomplished without interfering with passage of the air to the nozzle bore 54 when the valve 60 is fully closed. Thus it will be noted that the forward end of the tubular support 72 is spaced a substantial distance rearwardly from the rear end of the nozzle 52 so that ample space is provided to accommodate air flow to the nozzle bore and past the discharge tip of the liquid discharge tube 74.

While the preferred embodiment of the invention has been illustrated and described, it will be understood that changes in construction may be made within the scope of the appended claims without departing from the spirit of the invention.

I claim:
1. A fogging device comprising
a housing enclosing a power driven air impeller and having air inlet and air outlet openings,
liquid supply means including a discharge tube positioned substantially coaxially and adjacent said air outlet opening with clearance for flow of air therearound to said outlet opening,
said housing having a group of spaced apertures therein surrounding and spaced from said outlet opening, and
valve means shiftable on said housing between a position closing said apertures and a position opening said apertures to a predetermined extent,
said valve means being spaced from and clear of said outlet opening.

2. A fogging device as defined in claim 1,
wherein said housing mounts a nozzle having an elongated outwardly flaring passage constituting said outlet opening,
said discharge tube terminating in said passage adjacent the small diameter part thereof.

3. A fogging device as defined in claim 1,
wherein said housing includes a tapered circular portion surrounding said outlet opening and having said group of apertures formed therein,
said valve means constituting a member having a tapered circular portion rotatable on and engaging said tapered housing part and having interruptions adapted to register with said apertures.

4. A fogging device as defined in claim 1,
wherein means in said housing supports said discharge tube and includes a plurality of vanes to direct air flow toward said outlet opening and adjacent said apertures.

5. A fogging device as defined in claim 1, and
a skirt portion projecting forwardly of said housing outwardly of and adjacent said apertures.

6. A fogging device as defined in claim 1, wherein
said liquid supply means includes a liquid container and a conduit connected to said discharge tube and adapted to extend into said container, and
carrier means connected to said housing and releasably interlocking with said container.

7. A fogging device as defined in claim 1,
wherein said housing includes a frusto conical portion and a nozzle with an elongated passage cooperating to define a venturi having an outwardly flaring discharge portion,
said discharge tube terminating within said venturi adjacent the minimum diameter portion thereof.

8. A fogging device as defined in claim 1, and
a nozzle projecting from said housing and having a passage defining said outlet opening,
said valve means including a member rotatable on said nozzle and having a portion engaging said housing around said apertures and interrupted for selected registration with said apertures.

9. A fogging device as defined in claim 1, wherein
the portion of said housing in which said apertures are formed is frusto conical, and
said valve means includes a frusto conical valve member rotatable on said housing and adapted to span said apertures,
said valve member having interruptions adapted to register with said apertures, and
a skirt projecting forwardly from the margin of said valve member.

10. The method of forming and regulating the discharge of a fog from a housing, consisting of the steps of
directing air at high velocity through said housing toward a venturi outlet in which a liquid supply member is located to educe minute particles of liquid into said air stream and discharge air and entrained liquid in an expanding conical fog pattern,
discharging air from said housing through a circular series of discharge apertures surrounding said outlet in a plurality of forwardly directed streams each impinging upon said conical expanding fog discharge and
regulating the size of said discharge apertures to vary the proportion of the total air flow which passes through said venturi outlet, the rate of eduction of liquid, and the extent to which impingment of air upon said fog discharge reduces the longitudinal travel of fog and increases lateral dispersion of the fog.

References Cited

UNITED STATES PATENTS

| | | | |
|---|---|---|---|
| 2,675,147 | 4/1954 | Odom | 222—193 |
| 2,029,141 | 1/1936 | Warner | 239—351 |
| 1,899,749 | 2/1933 | Deutsch | 239—351 |
| 1,875,729 | 9/1932 | Hermann | 239—351 |

EVERETT W. KIRBY, *Primary Examiner.*